March 21, 1961     R. T. McBRIDE     2,976,185
COATED POLYMERIC THERMOPLASTIC DIELECTRIC FILM
Filed Dec. 12, 1955
Continuous Coating Of Cured
Polymeric Silicone Resin
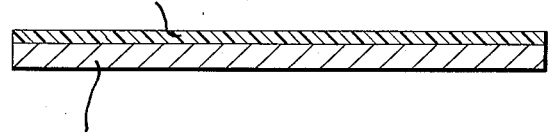
Balanced, Heat-set Polyethylene
Terephthalate Base Film.
INVENTOR
RICHARD THOMAS McBRIDE
BY
ATTORNEY

United States Patent Office 2,976,185
Patented Mar. 21, 1961

2,976,185

COATED POLYMERIC THERMOPLASTIC DIELECTRIC FILM

Richard Thomas McBride, Buffalo, N.Y., assignor to E. I. du Pont de Nemours and Company, Wilmington, Del., a corporation of Delaware Filed Dec. 12, 1955, Ser. No. 552,301

2 Claims. (Cl. 117—138.8)

This invention relates to a process of improving the dielectric life of polymeric thermoplastic materials useful as electrical insulation and to the product of such process and, more particularly, to a coated polyethylene terephthalate film having an improved dielectric life.

Polyethylene terephthalate film, particularly oriented film (film which has been stretched and/or rolled in two directions and heat-set at elevated temperatures within the range from 150°–250° C.) has been found to possess a unique combination of electrical, physical, and chemical properties which make it outstanding for use as a dielectric. This is particularly true of polyethylene terephthalate film which has been stretched and/or rolled to substantially the same degree in both directions, e.g., 3X, where X equals the original dimension of the film, to obtain a substantially "balanced" film, which means that the physical properties of the film as measured in both directions are substantially the same. The oriented, heat-set polyethylene terephthalate film is outstanding as a dielectric because it retains a considerable percentage of its electrical properties, strength, and durability at elevated operating temperatures. Consequently, the film is particularly useful as a dielectric in capacitors, motors, generators, transformers, etc., at not only moderate operating temperatures, but also at ambient temperatures approaching 150°–175° C.

In extending the usefulness of polyethylene terephthalate and like thermoplastic polymeric film dielectric to a wider variety of electrical end uses, it became apparent that the dielectric life of the film required improvement, particularly for use in equipment subjected to high voltage stresses. As employed herein, the term "dielectric life" of the polymeric thermoplastic film applies to the actual time that a particular film may be subjected to a particular voltage stress under conditions of corona discharge before actual physical breakdown, i.e., rupture, of the film dielectric.

It is the action upon the polymer film dielectric of corona discharge (in air or other gaseous medium) which causes actual physical breakdown of the film under conditions of a particular voltage stress (a potential difference large enough to produce a visible discharge but not large enough to produce instantaneous breakdown). Obviously, the lower the voltage stress, the longer the dielectric life of the film. "Corona discharge" is defined as the discharge of electricity which appears upon the surface of a conductor when the potential gradient exceeds a certain value. For example, when a continuous potential applied to a pair of narrow wires is slowly increased, the voltage will be reached at which a hissing noise is heard, and a pale violet light is visible (in the dark) around the wires. This voltage is defined as the "critical visual corona point." Corona is due to ionization of the air or surrounding gases (it does not occur in a vacuum). That is, the air in the ionized region is conducting, and this results in increasing the effective diameter of the conductor. For example, even though a film dielectric is wound tightly around a wire, air is not entirely excluded from the space between the conductor and the film dielectric; and it is the air or other gaseous medium which is ionized. The corona envelops a conductor as a concentric cylinder, and the outside diameter becomes such that the gradient at that point decreases to the rupturing point of the air. Beyond this point, the corona cannot increase for the constant applied voltage because the gradient decreases with increasing radial distance from the wire. The glow or breakdown of the surrounding air starts first at the point of maximum gradient or at the conductor surface. It is the bombardment of the dielectric film with ions or electrons that actually results initially in roughening or pitting the surface of the film. As the bombardment continues, the film eventually ruptures; hence, this causes short circuits owing to the physical failure.

An object of the present invention is to provide a polymeric thermoplastic dielectric film having increased dielectric life. A further object is to provide a polyethylene terephthalate film dielectric having increased dielectric life. A further object is to provide a process of improving the dielectric life of polymeric thermoplastic dielectric compositions, particularly polyethylene terephthalate film. Other objects will be apparent from the following description of the invention.

These objects are realized in accordance with the present invention which, briefly stated, comprises providing a dielectric base film of thermoplastic polymeric material, e.g., polyethylene terephthalate, with a relatively thin adherent continuous coating of a cured polymeric silicone resin.

The present invention will be further described specifically with respect to improving the dielectric life of polyethylene terephthalate film, but it should be understood that the invention is applicable as well to enhancing the dielectric life of other types of unplasticized polymeric thermoplastic films useful as dielectrics, such as films of polyethylene, polytetrafluoroethylene, polystyrene, polyamides, etc.

The silicone resins which may be employed in preparing the present coating compositons include a variety of well-known silicone resins fully described in the prior art. For example, United States Patent Numbers 2,258,218, -220, -221 and -222 in the name of E. G. Rochow describe and claim a variety of types of silicone resins which may be employed in preparing the present coating compositions. The methyl polysiloxane resins, also known as methyl silicone resins, are described and claimed in United States Patent Number 2,258,218. These heat-hardenable methyl polysiloxane resins may be prepared, for example, by hydrolysis of suitable mixtures of methyl silicon halides, or mixtures of methyl silicon halides and a silicone tetrahalide, in such proportions that the resulting methyl polysiloxane resins contain an average of from 1 to substantially less than 2, preferably 1.3 to 1.7 methyl groups per silicon atom. The liquid hydrolysis and condensation products are resinous materials which may be further condensed or polymerized to a solid state.

Depending upon the nature of the starting materials employed in preparing, for example, a methyl silicone resin, the polymer chains are generally made up of the following types of unit structures. The dimethylsiloxy group,

comprises a considerable portion of the polymeric chains, particularly when the methyl-to-silicon ratio approaches 2. Generally, the above structural unit is assumed to include half of each of the two associated oxygen atoms and, hence, is more properly written,

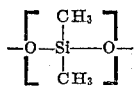

The presence of the monomethyl siloxane structural unit in the polymer chain accounts for the considerable degree of cross-linking in the structure of the silicone resins, particularly those having a methyl-to-silicon ratio considerably less than 2, e.g., 1.2, 1.3, 1.5. The monomethyl siloxane unit is written as,

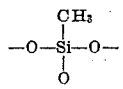

A third type of structural unit which may be found in the methyl siloxane resins is the trimethyl siloxy radical,

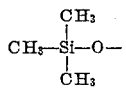

This structural unit is found as a terminal unit of a polymer chain in that the methyl groups are not capable of further condensing.

As mentioned above, other groups or radicals may replace the methyl groups in the above illustrations of typical structural units, and the resulting siloxane resins take on different characteristics. For example, United States Patent Number 2,258,220 describes and claims ethyl polysiloxane resins (ethyl silicone resins). The structure of these resins comprises structural units similar to those illustrated above except that the ethyl group replaces the methyl group.

United States Patent Number 2,258,221 describes aroxyaryl or aroxyalkyl silicone resins. Here again, the general structure of these resins contains structural groups similar to those given above except, for example, the methyl radicals are replaced with aroxyaryl or aroxyalkyl radicals.

United States Patent Number 2,258,222 describes still another type of silicone resin wherein one methyl radical in the structural units given above is replaced with an aryl group, such as a phenyl group or a halo-aryl radical. On the other hand, another useful group of silicone resins are the aryl silicone resins or aryl polysiloxane resins wherein all methyl groups in the above-illustrated structural units are replaced with aryl groups, such as phenyl groups.

A considerable number of techniques and processes have been developed for preparing the silicone resins and three of the more common procedures, described with respect to preparing methyl silicone resins, are as follows:

(1) Dimethyl silicone may first be prepared by hydrolyzing dimethyldichlorosilane or its esters, and then oxidized with air and a catalyst in accordance with the process described in United States Patent Number 2,438,478 to attain the desired methyl-to-silicon ratio.

(2) Dimethyldichlorosilane may be mixed with methyltrichlorosilane or silicon tetrachloride and then hydrolyzed and the products co-condensed.

(3) Silicon tetrachloride may be partially methylated (as with methylmagnesium chloride) to the desired methyl-to-silicon ratio and the reaction mixture hydrolyzed directly as illustrated in United States Patent Number 2,258,218.

The methyl-to-silicon ratio of the final resin product is normally dependent upon the nature of the initial reactants or raw materials and the conditions of the condensation reaction. The closer the methyl-to-silicon ratio is to 2, the lower the degree of cross-linking in the resin structure; and as the methyl-to-silicon ratio approaches 1, the greater the degree of cross-linking in the resin structure. In general, it appears desirable to employ silicone resins in the present coating compositions having an R/Si ratio from about 1.3 to 1.8, where R stands for any of the types of substituent groups, or combinations thereof, mentioned above, that is, methyl, ethyl, phenyl, etc. For example, when a methyl phenyl silicone resin is used, it is normally preferred to have a higher proportion of methyl groups than phenyl groups in the resin in order to avoid brittleness, for example, a resin having an average of 1.00 methyl group and 0.80 phenyl group per silicon atom.

In the present invention it is preferred to employ a flexible silicone resin. For example, the methyl phenyl silicone resins have been found to be highly desirable from the standpoint of flexibility, these resins being more flexible than the dimethyl silicone resins and the diphenyl silicone resins.

The final step in providing the thermoplastic dielectric film, e.g., polyethylene terephthalate film, with a non-tacky uniform coating of the silicone resin is the curing of the resin coating at moderate or elevated temperatures. Most of the curing agents are designed to promote relatively rapid curing at moderately elevated temperatures; and it is important in the present situation to be able to effect curing at temperatures which will not adversely affect the physical, electrical, and chemical properties of the base thermoplastic film dielectric. Numerous types of curing or vulcanizing agents may be employed and these are specifically listed and described in the prior art. Additional quantities of the curing agents may be added to the silicone resin coating compositions in the form of solutions of the curing agents in the solvent, such as the same solvent in which the resin is to be dissolved, e.g., toluene, xylene, etc. Various curing agents which may be employed for the silicone resins include lead salts, such as lead naphthenate, lead octoate, zinc octoate and benzoyl peroxide.

The silicone resins are conveniently applied to thermoplastic polymeric base films from solutions in solvents. The coating composition may be applied to one or both surfaces, preferably both surfaces, of the base film by any desired expedient; and the coated film may thereafter be dried at room temperature or a moderately elevated temperature to remove solvent. Curing of the silicone resin may well be effected at room temperature, depending on the curing agent, and in other cases may be carried out at elevated temperatures, e.g., 100°–175° C. for durations from 15–60 minutes.

It may be necessary, depending upon the end use for the coated dielectric films of the present invention, to apply a subcoating to the base dielectric film, e.g., oriented heat-set polyethylene terephthalate film, to improve adhesion between the base film and the silicone resin coating. When applying the silicone resin coating compositions to polyethylene terephthalate film, it is preferred to apply a sub-coating which is chemically similar to the base film. Any suitable sub-coating may be employed provided that they improve the adhesion between the base film and the present coatings and do not materially adversely affect the original combination of physical, electrical, and chemical properties of the base film. Preferred sub-coatings include copolyesters derived by reacting glycol, terephthalic acid, or low alkyl ester thereof with a second acid or alkyl ester thereof from the group consisting of sebacic acid, isophthalic acid and hexahydroterephthalic acid. Normally, in preparing suitable sub-coatings, it is preferred that the sub-coating composition contain at least 50% of the terephthalic acid component, based upon the total weight of acid components. The sub-coating compositions may be applied to the base dielectric film from solvent solutions, or homogeneous thin films of the copolyester compositions may be first applied to the dielectric base film by lamination under heat and moderate pressure.

The accompanying drawing is a greatly enlarged cross-sectional view illustrative of a typical product of this invention.

The following examples of embodiments of the present invention further illustrate the principles and practice of the invention. Parts are by weight.

EXAMPLE 1

50 parts of methyl phenyl silicone resin (General Electric SR-17) and 1.5 parts of lead octoate were dissolved in 50 parts of toluene to form a coating composition. Oriented (stretched 200% in both directions), heat-set (at a temperature of about 200° C.) polyethylene terephthalate film, ½ mil in thickness, was passed through the coating composition and then between doctor rolls to remove excess coating composition. The coating was dried at room temperature for 1 hour. Thereafter, the coating was cured at 150° C. for 30 minutes. The resulting coating was smooth, non-tacky, and firmly adherent to the base polyethylene terephthalate film.

EXAMPLE 2

60 parts of methyl phenyl silicone resin (General Electric SR-32) and 1.8 parts of lead octoate were dissolved in 40 parts of toluene to form a coating composition. Oriented (stretched 3X in both directions), heat-set (at a temperature of about 200° C.) polyethylene terephthalate film, ½ mil in thickness, was first coated with a thin sub-coating (less than 1 gm./m.$^2$) of a copolyester of ethylene terephthalate/ethylene isophthalate (60/40 [1]) from a solvent (chloroform solution), and the solvent was permitted to evaporate at room temperature. The sub-coated film was then passed through the xylene solution of the silicone resin-catalyst mixture and then between doctor rolls to remove excess coating composition. The coating was dried at room temperature for 1 hour. Thereafter, the coating was cured at 150° C. for 15 minutes. The resulting coating was smooth, non-tacky, and firmly adherent to the base polyethylene terephthalate film.

EXAMPLE 3

50 parts of methyl phenyl silicone resin (General Electric SR-17) and 1.5 parts of lead octoate were dissolved in 50 parts of toluene to form a coating composition. Oriented (stretched 3X in both directions), heat-set (at a temperature of about 200° C.) polyethylene terephthalate film, ½ mil in thickness, was first coated with a thin sub-coating (less than 1 gm./m.$^2$) of a copolyester of ethylene terephthalate/ethylene isophthalate (60/40 [1]) from a solvent (chloroform solution), and the solvent was permitted to evaporate at room temperature. The said coated film was then passed through the toluene solution of silicone resin and then between doctor rolls to remove excess coating composition. The coating was dried at room temperature for 1 hour. Thereafter, the coating was cured at 150° C. for 15 minutes. The resulting coating was smooth, non-tacky, and firmly adherent to the base polyethylene terephthalate film.

EXAMPLE 4

Example 1 was repeated except that the silicone resin was cured at 100° C. for 20 minutes. The resulting coating was smooth, non-tacky, and firmly adherent to the base of polyethylene terephthalate film.

Dielectric life test

The film sample to be tested was placed on a brass plate to which the high voltage was to be applied. A brass rod (6″ long and ¼″ in diameter) was placed on top of the film sample and normal to the brass plate (the film sample was sandwiched between the brass plate

[1] Reaction product of glycol and 60 parts dimethyl terephthalate and 40 parts dimethyl isophthalate.

and an end of the brass rod). The rod served as the ground electrode. The end of the rod touching the film sample was rounded off at a radius of curvature of ⅟₁₆″. The pressure exerted on the film was due only to the gravitational forces on the rod. The entire test apparatus was set up in air. Sufficient voltage was applied to the plate to give a voltage stress of 1,000 volts per mil across the sample. Failure of the sample was indicated by a rapid increase in the flow of current between the brass plate and brass rod. At the moment current flowed, an arc was struck between the electrodes, the arc passing through the hole in the film caused by the failure. The abrupt increase in the flow of current was used to trip a relay giving a record of the failure. Ten samples were treated simultaneously. The time to the failure of the fifth sample was used as a measure of the dielectric life (under corona discharge conditions) of the material tested.

The following table, Table I, indicates the time required for the fifth sample out of 10 to fail under a voltage stress of 1,000 volts/mil at the stated temperature. The weight of the coating is expressed in terms of the total film thickness of the coated film (the base dielectric film was 0.5 mil in thickness). Table I summarizes Examples 1-4, inclusive.

TABLE I.—DIELECTRIC LIFE (CORONA RESISTANCE) OF POLYETHYLENE TEREPHTHALATE FILM (½ MIL IN THICKNESS) COATED WITH CURED SILICONE RESINS

| Example | Coating Compositions | Total Film Thickness (mils) | Temp. of Test, ° C. | Dielectric Life at 1,000 Volts/Mil (time to 5th failure of 10 samples (hours) |
|---|---|---|---|---|
| Control | None | 1.0 | 23 | 10 |
| 1 | methyl phenyl silicone | 1.03 | 23 | 67 |
| 2 | do.[1] | 1.18 | 23 | 133 |
| 3 | do.[1] | 1.20 | 23 | 147 |
| 4 | do | 1.04 | 120 | 92 |

[1] Sub-coated with a thin coating (less than 1 gm./m.$^2$) of a copolyester of ethylene terephthalate/ethylene isophthalate (60/40).

As can be seen from the table above, the use of coatings featuring the use of a flexible polymeric silicone resin has substantially increased the corona life of the dielectric base film substantially at both 23° and 120° C. These coatings extend the usefulness of polyethylene terephthalate, high-density polyethylene and like thermoplastic film dielectrics to a variety of end uses, particularly for use in equipment subjected to high voltage stresses.

I claim:

1. Balanced, heat-set polyethylene terephthalate base film having a continuous coating consisting essentially of a cured polymeric silicone resin having an R/Si ratio from about 1.3 to 1.8 wherein R is selected from the group consisting of methyl, ethyl and phenyl.

2. Balanced, heat-set polyethylene terephthalate base film having an adherent continuous coating consisting essentially of a cured methyl phenyl silicone resin having an average of 1 methyl group and 0.8 phenyl group per silicon atom.

References Cited in the file of this patent

UNITED STATES PATENTS

| | | |
|---|---|---|
| 2,258,222 | Rochow | Oct. 7, 1941 |
| 2,497,376 | Swallow et al. | Feb. 14, 1950 |
| 2,588,365 | Dennett | Mar. 11, 1952 |
| 2,678,285 | Browning | May 11, 1954 |
| 2,808,347 | Blatz | Oct. 1, 1957 |
| 2,823,421 | Scarlett | Feb. 18, 1958 |
| 2,878,142 | Bohaty | Mar. 17, 1959 |

FOREIGN PATENTS

| | | |
|---|---|---|
| 622,671 | Great Britain | May 5, 1946 |
| 698,605 | Great Britain | Oct. 21, 1953 |